3,387,518
FLYING TWO-DRUM SHEARS FOR CUTTING
ROLLED STOCK
Karl-Heinz Bernhardt, Hilden, and Werner Marx, Dusseldorf, Germany, assignors to Schloemann Aktiengesellschaft, Dusseldorf, Germany, a German company
Filed Jan. 6, 1966, Ser. No. 519,045
Claims priority, application Germany, Jan. 9, 1965, Sch 36,357
9 Claims. (Cl. 83—37)

ABSTRACT OF THE DISCLOSURE

Flying two-drum shears for cutting rolled stock, one of the drums enclosing a piston slidable in a cylindrical cavity, and a blade, slidable in the cutting direction, connected, preferably integrally, with the piston, and means for producing shock waves of pressure in the cylindrical cavity, acting upon the piston, and thereby sharply advancing the said blade; and methods of cutting rolled stock with such shears.

This invention relates to flying shears of the two-drum type. In such shears of the conventional construction the rolled stock to be cut is passed through between two drums, to the periphery of each of which a cutting blade is secured. Owing to the rotation of the drums, the two blades come into engagement with one another, and in so doing cut through the rolled stock. Since the blades are both rigidly secured to their drums, the cutting operation starts even before the two upper blade edges have advanced close to one another, and before the blades are in alignment. Owing to this the material is not clearly cut through, but is at first crushed and deformed. On this ground these shears are only suitable for cutting material of thicknesses up to a maximum of about 25 millimetres. On both blades a component of cutting power becomes operative in the direction of travel of the rolled stock, and this acts as an additional bearing load on the drum bearings, and involves an increase in the cutting power to be applied. After the cut has been executed, obstructions of the succeeding rolled stock are liable to occur before the blades, because the two blades, even after executing the cut, are still overlapping, and do not at once come out of contact, and the velocity component of the drums in the direction of travel of the rolled stock is smaller after the cut has been effected. The drums must therefore be moved with somewhat greater peripheral speed than the rolled stock. Conventional two-drum shears are particularly expensive owing to the fact that the cutting length is dependent upon the speed of revolution of the drums. In order to maintain the cutting lengths required, these shears are therefore in part operated periodically, and only accelerated briefly for a cut, and stopped again after executing the cut. This, however, particularly with high speeds of the rolled stock, requires powerful driving motors, with great absorption of power. Moreover the number of cuts possible per unit of time is determined by the duration of the starting and by the stopping time of the electric motor that drives the shears. In order to attain a minimum time for the acceleration of the blades, and therefore also to be able to cut short lengths, the moment of inertia of the driven members must be kept as small as possible. Since the cutting lengths are to be equal, the times for the acceleration of the blades up to the beginning of the cut must also be exactly determined. This requires stable starting properties of the driving motor, and an accurately determined position of the blades before the commencement of their acceleration.

With other constructional forms the drums revolve continuously, and the cutting length is adjusted by regulating the speed of revolution. A double-crank device here synchronises the drum speeds with the speed of the material at the moment of cutting. These double-crank devices, however, involve additional expense and complication of such shears.

Other drum shears are constructed with drums of different diameters, which revolve at the same peripheral speed, so that the cutting blades only come to the cutting point after multiple revolutions of the smaller drum. The object of this is to enable the drums to revolve continuously, so that they do not have to be accelerated again for each cut. Even these shears, however, have the disadvantage that the cutting length is difficult to control, owing to its dependence upon the peripheral speed of the drums.

The present invention is based upon the problem of providing shears which will ensure reliable work, even at high speeds of travel of the rolled stock, with a reduction in the cutting work to be supplied, and will ensure short lengths without needing controlling elements that are costly to construct. In addition to this, with these shears, a clean cut is to be practicable, which will be free from obstructions and crushings.

According to the invention this aim is attained first of all by the feature that at least in one drum, the blade, for the production of the cutting force, is operatively connected with a piston which is guided in the drum, and is adapted to be actuated by shock waves or pressure waves.

By this means the result is obtained that the cut is carried out without involving the cutting-force component occurring with conventional two-drum shears in the direction of travel of the rolled stock, and without crushing or unnecessarily injuring the rolled stock.

Furthermore the cutting work to be applied is considerably reduced thereby, and does not need to be furnished by the drum drive.

In a further development of the invention, the shock waves or pressure waves in the stroke space of the piston are effected by methods known from high-energy shaping.

In this way the cutting movement is carried out in a very short time, so that obstruction or compression of the material in front of the blades does not occur, and a clean cut is executed. The cutting work is thus furnished only by the shock waves or pressure waves, and a considerable reduction of the electrical drive is thereby obtained.

The shock waves or pressure waves may advantageously be produced by electrical discharge impulses known in themselves, in the stroke space, filled with liquid, of the piston.

A further helpful measure consists in causing a restoring force to act upon the piston, this force with-drawing the piston, including the blade, immediately after the execution of the cut, into its initial position, so that the rolled stock is liberated again in the direction of travel after the cut has been effected.

According to a further feature of the invention, the cutting blade is advantageously made integral with the piston.

A further advantageous development of the invention consists in the feature that the electrical energy requisite for the discharge impulses is supplied to the electrodes by sliding contacts co-operating with slip rings arranged on the periphery of the drum.

By this arrangement the energy of discharge is supplied to the stroke space of the piston without needlessly complicating the electrical transmission elements, and furthermore, the energy of discharge is immediately available, in the working position of the two blades, after closure of a high-tension switch.

In a further development of the invention the rocking movement of a drum is effected by the thrust of the rolled stock, so that in the absence of a complicated drum drive, one blade does not have to be directly retracted after the cut has been effected, and the second blade may be constructed as a stationary blade.

According to a further feature of the invention, the rocking movement of the drums may alternatively be produced by a power appliance. In this way, as compared with the expensive electrical drive, a considerable cheapening is obtained, and an easy adjustability of the positions of the two blades relative to one another is attained.

The shears according to the invention may advantageously be so operated that with drums revolving continuously and a blade retracted, the controlling inpulse for advancing the retracted blade is imparted, the blades are located close together and in alignment. By this method of working the result is obtained that in contrast with periodically operated shears, an electric motor of less stable properties and of lower absorption of power may be employed for driving the drums.

In a further development of the invention the shears may also advantageously be so operated that with drums stationary before the cut, the blades stand opposite to one another and in alignment, and the drums, upon execution of the cut by the blades, are rocked, by means of a power appliance, correspondingy to the speed of travel of the rolled stock.

Hence the cutting can be effected directly from the position of rest of the two drums, without previous acceleration of the same, and without the factors of uncertainty given by the two-drum shears hitherto usual, by the necessary synchronising of the peripheral speeds of the drums with the speed of passage of the rolled stock at the moment of cutting, so that the instant of cutting is precisely defined. The result is thereby obtained that the inaccuracies arising with the maintenance of the cut lengths are reduced to a minimum, which depends only upon the switching time of the controlling elements, and upon the very great acceleration of the blade upon being actuated by shock waves or pressure waves. Owing to the rocking movement of the drums, effected with the executing of the cut, in the direction of travel of the rolled stock, the risk occurring with this process of obstructions of the succeeding rolled stock before the blades is obviated, so that even when the acceleration of the blade is too small, the free passage of the rolled stock after the cutting is ensured by the restoring force.

Advantageously, after execution of the cut, with the aid of this method, and after rocking of the drums correspondingly to the speed of travel of the rolled stock, the drums, with the blade retracted, are rocked back, by means of the power appliance, into their position with the two blades located close together and in alignment.

Two constructional examples of the invention are illustrated in the accompanying drawings, in which:

FIGURE 3 shows the drums, with the slip rings.

Figure 1:
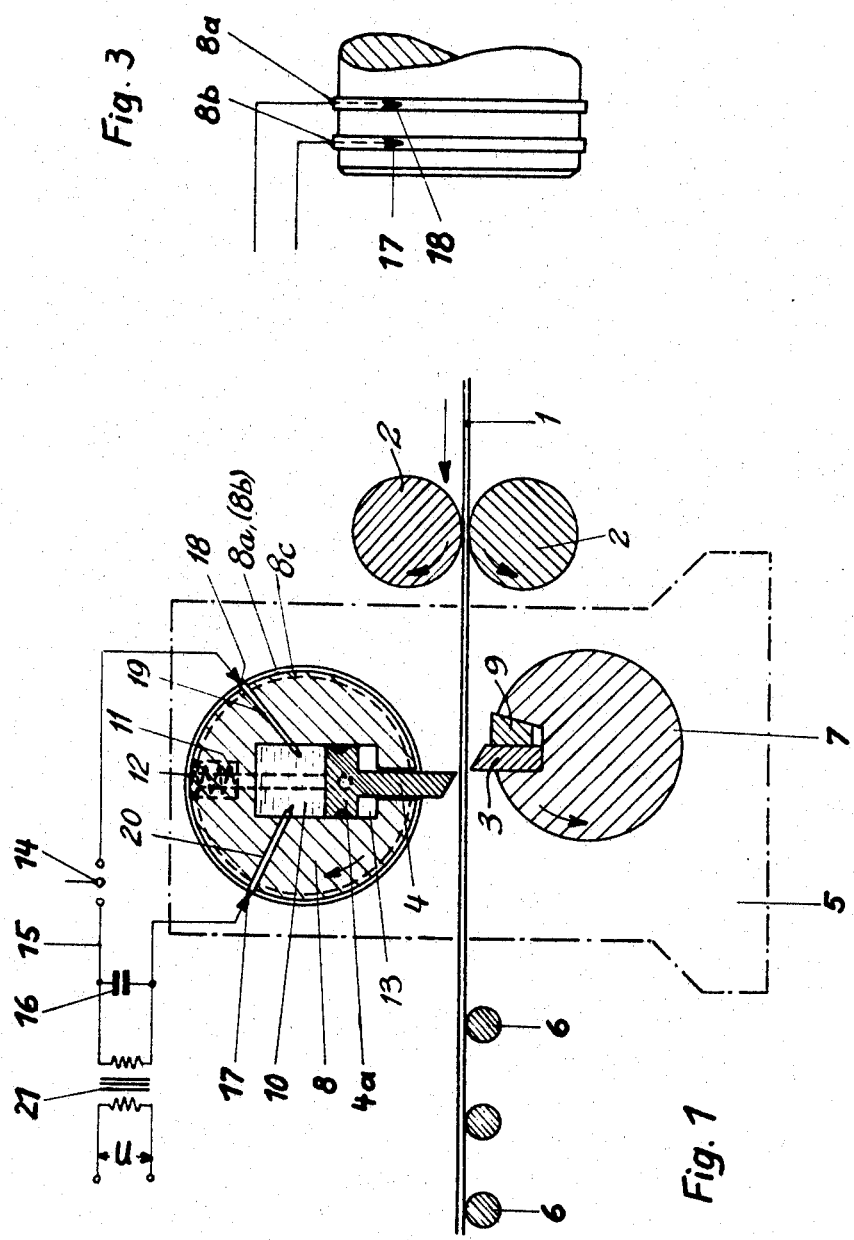
FIGURE 1 shows one embodiment in section, with the circuit diagram of a discharge circuit.

By 1 is denoted the rolled stock to be cut through, which enters, through a set of driving rollers 2, between the two blades 3 and 4 of the shears, and, on the other side of the shears, bears upon a roller table 6. The blades 3 and 4 are guided in two drums 7 and 8, which both revolve, in directions indicated by arrows, with constant velocity, in a stand 5. The blade 3 is secured in the drum 7 by means of spacers 9. The blade 4 is the cutting blade, which executes the cutting movement, and forms constructionally a unit with the piston 4a. The piston 4a is slidably guided in a stroke space or cylinder space 10, filled with pressure medium, liquid for example, and is resiliently secured in its initial position by a restoring force produced with the aid of a spring 11 and a bolt 12. It is easy to see that the blade 4 might be resiliently held in its initial position by charging the stroke space or cylinder space 13 with gas. If a partial cut is to be carried out, a discharge circuit 15 is closed by a high-tension switch 14. The closing of the high-tension switch 14 is brought about by an electric impulse, which is imparted by a control circuit, not shown. By the aid of this control circuit, and by regulating the speed of revolution of the two drums 7 and 8, the requisite cutting length can easily be altered and accurately adjusted. After the closing of the discharge circuit 15, a previously charged condenser 16 discharges by way of two sliding contacts 17 and 18 and slip rings 8a and 8b (FIGURE 3) (which are separated from the drum 8 by an insulating ring 8c) and by way of two electrodes 19 and 20, which are each secured in a bore in the drum 8, from which they are insulated, and in this way a flash-over path is built up in the pressure fluid in the stroke space 10. In the neighbourhood of this flash-over path, by heating and vaporisation of a thin filament of water, a plasma is formed, and this takes place so quickly that the surrounding pressure medium, owing to its inertia, hinders the expansion of the highly stressed plasma, so that a shock wave or pressure wave occurs.

This shock wave or pressure wave flings the blade 4 with great acceleration against the rolled stock 1, so that the latter is cut through. Immediately after the execution of the cut the blade 4 is pulled back into its initial position by way of the bolt 12 with the aid of a restoring force produced by the spring 11. This entire operation is effected in so short a time that a clean cut is executed without involving any risk of crushing the rolled stock. The control circuit, not shown, which closes the high-tension switch 14, and thus releases the cutting movement of the blade 4, is protected against discharges of the switching impulse that releases the cutting movement in any position other than the cutting position shown in FIGURE 1. The condenser 16 is recharged for the next cut through a transformer 21, which is operated by a source of voltage U. It is obvious that the shock waves or pressure waves in the stroke space 10 can also be produced by other methods known from high-energy conversion, as for instance by pneumatic-mechanical methods (Dynapak), explosion methods (with a gaseous or liquid medium), or by magnetic methods.

Figure 2:
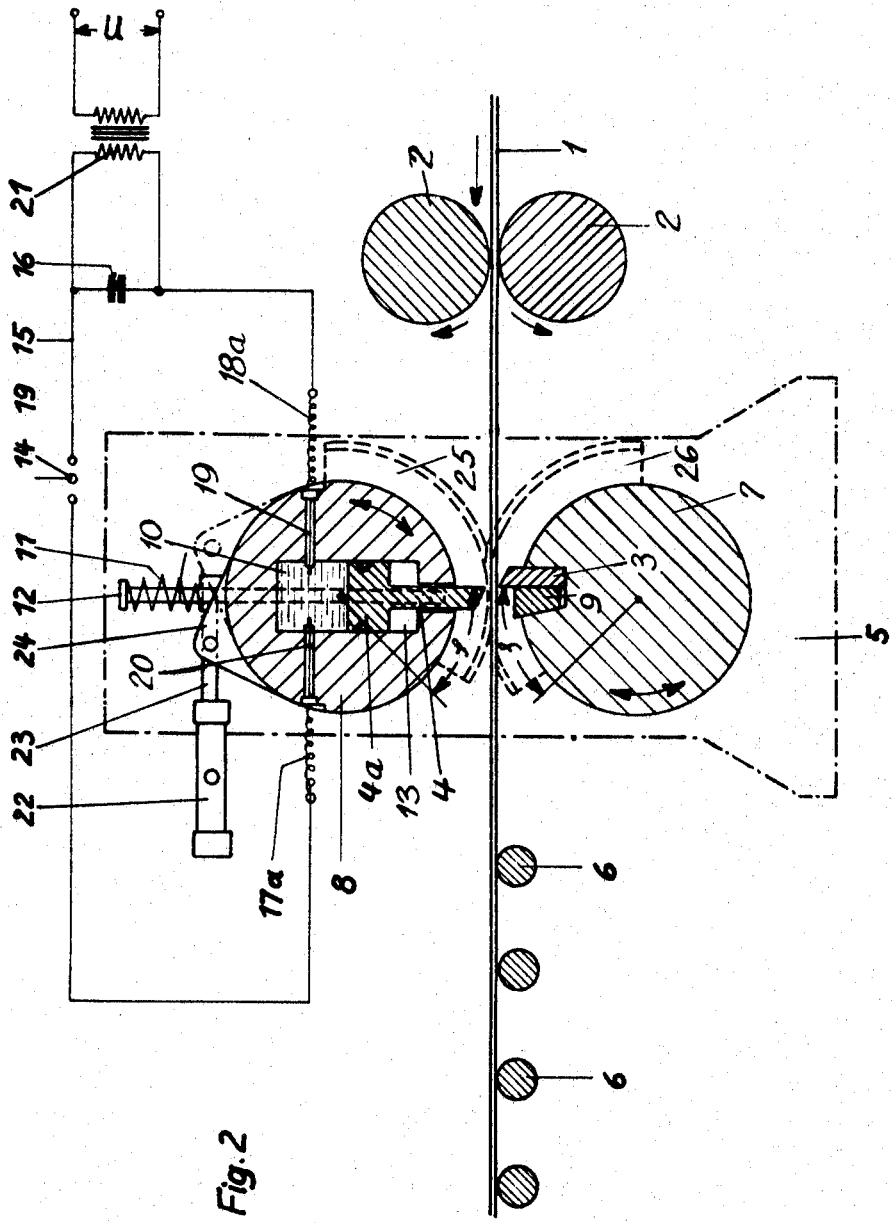
FIGURE 2 shows a further embodiment in section, with the circuit diagram of the associated discharge circuit.

The invention may also be carried out as illustrated by way of example in FIGURE 2. The construction and operation of the shears is as a whole the same as in the constructional example shown in FIGURE 1, even the positions in FIGURE 2, except for the additional members, being as indicated in FIGURE 1, with the difference that the drums 7 and 8 do not revolve continuously, but are stationary before the cut, and, only with the execution of the cut, are rocked through the angle, which amounts to about 45°, by way of a power appliance, a stroke cylinder 22 in the constructional example, in the direction of the rolled stock and correspondingly to the speed of travel of the rolled stock. This rocking is obtained by admitting pressure fluid to the stroke cylinder 22, the piston rod 23 of which rocks the drum 8 by way of a lug 24, and, by transmitting this rocking movement by means of toothed segments 25 and 26, also drives the drum 7. By this rocking movement of the drums 7 and 8, the shears become more reliable in operation, because even if the blade 4, owing to an operational disturbance for example, is not run in quickly enough, the unhindered advance of the rolled stock is ensured. With rolled stock of great thickness it is also possible to utilize the thrust produced in the stock by the driving rollers 2 for rocking the drum 8, in that with the blade 4 still at first advanced after executing a cut, the stock following from the driving rollers 2 rocks the drum 8 with its cut surface by way of the blade 4. The blade 3 may in this case be constructed as a stationary blade.

After the blade 4 has been drawn back into its initial position by means of the spring 11 and the bolt 12, the drum 8 is rocked back into the cutting position, with the blade 4 guided in it. The drum 7, coupled to the drum 8 by means of toothed segments 25 and 26, is therefore also rocked back, together with the blade 3. Movable current cables 17a and 18a connect the discharge circuit 15 with the electrodes 19 and 20, so that the drum 8 and the drum 7 can execute the required rocking movements without any risk of breaking the conductors of the discharge circuit. The slip rings 8a and 8b and the insulating ring 8c are accordingly not required in this embodiment.

We claim:

1. Flying two-drum shears for cutting rolled stock, one of the drums being formed with a cylindrical cavity, and the shears further comprising a piston slidable in the cylindrical cavity, a blade slidably guided in the said drum in the cutting direction, this blade being operatively connected with the said piston, and means known from high-energy conversion for producing shock waves of pressure by explosion and discharge processes in the cylindrical space, acting upon the piston, and thereby sharply advancing the said blade.

2. Flying shears as claimed in claim 1, the means for producing the said shock waves being means known from high-energy conversion.

3. Flying two-drum shears for cutting rolled stock, one of the drums being formed with a cylindrical cavity, and the shears further comprising a piston slidable in the cylindrical cavity, a blade slidably guided in the said drum in the cutting direction, this blade being operatively connected with the said piston, the cylindrical space on one side of the piston being filled with liquid, means for producing electrical discharge impulses in this liquid, and thereby producing shock waves of pressure in the said space, acting upon the piston and thereby sharply advancing the said blade.

4. Flying two-drum shears as claimed in claim 1, further comprising means for retracting the piston after it has been advanced by a shock wave.

5. Flying two-drum shears as claimed in claim 1, the slidable blade being integral with the piston that actuates it.

6. Flying two-drum shears as claimed in claim 3, further comprising: electrodes immersed in the liquid in the cylindrical space, slip rings on the surface of the drum in which the cylindrical space is formed, and sliding contacts co-operating with the said slip rings, the electrical energy required for the discharge impulses being supplied to the said electrodes from the impulse-producing means through the said sliding contacts and slip rings.

7. Flying two-drum shears as claimed in claim 1, further comprising: means for steadily advancing the rolled stock towards and through the shears, and means actuated by the thrust of the advancing stock for imparting to at least one of the drums a partial revolution about its own axis.

8. Flying, two-drum shears as claimed in claim 1 further comprising power-actuated means for imparting to at least one of the drums a partial revolution about its own axis.

9. A method of cutting travelling rolled stock with flying two-drum shears, comprising the step, following a moment when the drums are stationary immediately before a cut, and the blades are opposite to one another and in alignment with one another, of executing the cut by turning the drums about their own axes, and advancing a blade slidable in one of the drums by means of a power appliance at a peripheral speed corresponding to the speed of travel of the rolled stock, and after the execution of the cut, of retracting the slidable blade, and turning the drums back again, by means of the power appliance, into a position with the two blades close together and in alignment with one another.

References Cited
UNITED STATES PATENTS

| | | | |
|---|---|---|---|
| 1,505,711 | 8/1924 | Johnson | 83—291 X |
| 1,965,523 | 7/1934 | MacFarren | 83—337 X |
| 2,703,614 | 3/1955 | Bottenhorn | 83—308 X |
| 2,768,690 | 10/1956 | Roberts et al. | 83—308 X |
| 2,825,402 | 3/1958 | Bostrom | 83—337 |
| 3,181,799 | 5/1965 | Wurzburg et al. | 241—1 |

JAMES M. MEISTER, *Primary Examiner.*